United States Patent
Jackson (10) Patent No.: US 7,397,417 B2
(45) Date of Patent: Jul. 8, 2008

(54) ELECTROMAGNETIC IMPULSE SURVEY APPARATUS AND METHOD UTILIZING A MAGNETIC COMPONENT ELECTROMAGNETIC ANTENNA

(76) Inventor: John R. Jackson, 7987 S. Saulsbury St., Littleton, CO (US) 80128-5620

( * ) Notice: Subject to any disclaimer, the term of this patent is extended or adjusted under 35 U.S.C. 154(b) by 0 days.

(21) Appl. No.: 11/468,628

(22) Filed: Aug. 30, 2006

(65) Prior Publication Data

US 2007/0075890 A1   Apr. 5, 2007

Related U.S. Application Data

(60) Provisional application No. 60/712,677, filed on Aug. 30, 2005.

(51) Int. Cl.
*G01V 3/08*   (2006.01)
*G01V 3/16*   (2006.01)
*G01S 13/88*  (2006.01)

(52) U.S. Cl. .................... 342/22; 324/331; 324/345; 324/348

(58) Field of Classification Search .......... 367/14, 367/188; 324/331, 345, 348, 349; 342/22
See application file for complete search history.

(56) References Cited

U.S. PATENT DOCUMENTS

| | | | |
|---|---|---|---|
| 3,126,510 A * | 3/1964 | McLaughlin et al. | 324/345 |
| 5,148,110 A * | 9/1992 | Helms | 324/348 |
| H1561 H * | 7/1996 | Thompson | 367/188 |
| 5,696,447 A * | 12/1997 | Coutellier et al. | 324/252 |
| 5,777,478 A * | 7/1998 | Jackson | 324/348 |
| 6,414,492 B1 * | 7/2002 | Meyer et al. | 324/348 |
| 6,462,549 B1 * | 10/2002 | Curtis et al. | 367/14 |
| 6,937,190 B1 | 8/2005 | Jackson | |
| 2006/0119363 A1 * | 6/2006 | Ligneul et al. | 324/337 |

OTHER PUBLICATIONS 4-page brochure (black & white, one-sided, full pages): *Magnetic Sensor Products*, Honeywell, Inc., Plymouth, MN (Oct. 1996).
19-page, full-page, one-sided article: Michael J. Caruso, Tamara Bratland, Dr. Carl H. Smith, Robert Schneider, *A New Perspective on Magnetic Field Sensing*, Honeywell, Inc., Plymouth, MN (May 1998).
15-page, full-page, one-sided brochure: *Sensor Products, Linear Magnetic Field Sensors*, Honeywell, Inc., Plymouth, MN (Apr. 2000).

* cited by examiner

*Primary Examiner*—Ian J Lobo
(74) *Attorney, Agent, or Firm*—Leyendecker & Lemire, LLC; Kurt Leyendecker (57) ABSTRACT

The invention relates to an apparatus and method for performing passive geophysical prospecting. More particularly, the present invention relates to an improved apparatus and method for locating and selected subsurface Earth material deposits or geologic formations bearing hydrocarbons, oil, gas, or commercially important ore deposits, precious metals, as a function of impulse discontinuities in the near surface atmosphere of the invention. A passive geophysical prospecting method and apparatus are provided. The apparatus has a magnetic component antenna for detecting electromagnetic radiation naturally emanating from the Earth's surface and an electrical signal from the detected electromagnetic radiation while traversing the Earth's surface by a vehicle traveling over land or water or in an airplane.

8 Claims, 5 Drawing Sheets

ELECTROMAGNETIC IMPULSE SURVEY APPARATUS AND METHOD UTILIZING A MAGNETIC COMPONENT ELECTROMAGNETIC ANTENNA

CROSS-REFERENCE TO RELATED APPLICATIONS

This application claims priority to Provisional U.S. Patent Application entitled "Electromagnetic Impulse Survey Apparatus and Method Utilizing A Magnetic Component Electromagnetic Antenna" filed Aug. 30, 2005 having Ser. No. 60/712,677, the disclosure of which is hereby incorporated by reference.

U.S. Pat. No. 6,937,190 filed Apr. 15, 2003, entitled Electromagnetic Impulse Survey Apparatus and Method, by John R. Jackson, is incorporated herein by reference.

BACKGROUND OF THE INVENTION

It is well known that petroleum deposits, ore bodies, and other valuable Earth materials are found at various locations and depths in the Earth, and that these Earth materials are often difficult if not impossible to find with the naked eye. Accordingly, it is also well known that many different exploration techniques and systems have been developed to provide a reliable indication of the presence of these commercially important deposits.

It is conventional, of course, to drill test holes at locations of particular interest, and to recover samples of Earth materials at various depths, to determine the actual character of the Earth materials. If cost were not a factor, drill holes such as for oil and gas would be cored throughout their entire length. This is not feasible, however, for reasons of economy. As such, cheaper procedures have been developed and utilized.

It is also conventional to measure topographical irregularities in order to obtain an indication of the existence of subsurface structures of particular interest. Similarly, it is conventional to measure differences in seismic reverberations, and to measure variations in gravitational pull at selected locations. Although such measurements are often used with success to locate faults, traps, and other subsurface Earth structures wherein oil and other valuable minerals could be found, most strata-graphic traps and the like do not contain such minerals, and therefore such measurements are most useful for eliminating unlikely areas of interest rather than to detect actual deposits of minerals.

More recently, procedures for subsurface prospecting have been developed which measure electromagnetic radiation emitted by the mineral-bearing formations. It is known, of course, that this planet itself constitutes and functions as a generator of electromagnetic radiation which, in turn, creates current flows within the Earth. Accordingly, measurement techniques such as those described in U.S. Pat. No. 3,679,978 have been developed to detect and analyze these magneto-telluric currents within the Earth bed adjacent the surface, as a direct indication of selected minerals of interest. Although effective in locating and measuring the extent of ore bodies, such techniques do not indicate the type of minerals present.

It is apparent that if the planet is a generator of electromagnetic radiation within itself, these current flows within the Earth will include both AC and DC currents which will be functionally related to both the individual mineral-bearing formations and their contents. Furthermore, it will be apparent that current flows within but adjacent the surface of the Earth will inherently create functionally related electrical fields adjacent but above the surface of the Earth. These electrical fields are composed of carrier waves having frequencies characteristic of the type of mineral in that formation.

Several techniques have been developed to measure these electrical fields which exist near but above the surface of the Earth. U.S. Pat. No. 4,507,611 to Helms describes a method of traversing the surface of the Earth and recording "solar wind activity of sufficient strength to detect anomalies related to surface and subsurface mineral deposits." This apparatus uses the root mean square (RMS) method to detect increases or decreases in the Earth's electrical fields. U.S. Pat. No. 3,942,101 to Sayer describes a prospecting apparatus that utilizes a distortion of the atmospheric electro-static potential gradient, which is suggested to be a result of the Nernst effect. Sayer teaches that the distortion provides a means for locating subterranean sources of geothermal energy.

Alterations in the Earth's magnetic fields known as "magnetic noise" as described by Slichter in U.S. Pat. No. 3,136,943, which discloses that such noise is primarily the product of lightning discharges. However, because many of these methods and apparatus are based on the AC components of the electrical fields, the techniques are more effective and reliable depending upon the size or area extent of the mineral deposit of interest. More particularly, the techniques based on the AC components are less sensitive and effective in detecting the presence of smaller mineral deposits. To overcome the shortcomings of the AC measurements, U.S. Pat. No. 4,841,250 to Jackson provides a technique utilizing the DC components of the electrical fields.

It is also known to utilize the electromagnetic radiation emitted by the mineral-bearing formations to create radioactivity "logs." In oil-field terminology, a "log" is a report that furnishes information regarding geological formations. A radioactivity log includes the gamma-ray log, gamma-gamma log, neutron-gamma log and neutron-neutron log. The gamma-ray log records the natural radioactivity in the form of gamma-rays in the bore hole emanating from the formation. The most abundant radioactive isotope is $K^{40}$, which occurs in potassium-bearing minerals and is especially abundant in clay minerals. Therefore, the gamma-ray log distinguishes shale beds from non-shale beds by recording a high gamma radiation. In the gamma-gamma log, the radiation is induced by bombarding the bore-hole walls with gamma rays. The amount of back-scatter is recorded. Because the more dense atoms resist the bombardment, the back-scatter is greater. Accordingly, the amount of back-scatter is directly related to the bulk density of the formation and to the porosity.

In the two neutron logs, the formation is bombarded with neutrons. The neutron-gamma log measures the induced gamma radiation from the heavier atoms. In this reaction, hydrogen ions absorb the neutron particles, and reduced gamma radiation indicates the relative abundance of hydrogen, which may exist largely in the fluids of pores. Therefore, the induced gamma radiation is inversely proportional to the porosity of the formation. The neutron-neutron log measures neutron capture within the formation, which again is proportional to the hydrogen density and therefore to the porosity or bulk density of the formation.

A limitation of the radioactivity log is that they cannot distinguish between water and hydrocarbons, e.g. oil. Both would indicate a relative abundance of hydrogen and, therefore, the presence of porous formations. These logs could not distinguish between these two. The use of radioactive detection at the Earth's surface or near surface has been well known for many years and known as radiometrics, which is a method to log variations in the Earth's natural radioactive emissions as one traverses the surface on land or by plane in order to measure decreases and increases in these emissions in order to locate oil, gas, and mineral deposits.

As discussed above, a primary magnetic field of electromagnetic energy is generated by the Earth itself and exists in the near surface atmosphere. Within the primary magnetic field exist random impulses of energy. These impulses, which occur within the audio frequency range, exist in the random vertical components of the Earth's primary magnetic field. The present apparatus seeks to measure the magnetic component of these impulses the audio frequency range. Secondary magnetic fields result from the current flows associated with the radiation emanating from the hydrocarbon accumulation within the Earth as the result of the chemical release of electrons during a reaction. As the random occurring impulses in the primary magnetic field interact with the secondary magnetic fields, energy is transferred to the secondary fields creating an impulse. The number of impulses is related to the strength of the secondary magnetic fields.

At present, the source of these random occurring impulses is speculative. However, it is widely believed that the impulses are related to lightning activity around the Earth. A study conducted by S. H. Ward showed the relationship between lightning and resulting changes in the measured electrical fields. [citation]. AIRBORNE AND GROUND, Geophysics, No. 4, 1959, pp. 761-789 describes measuring lightening activity in the audio range of frequencies near Kitwe in northern Rhodesia during the months of July, August, September and October of 1957. Another study concluded that lightning discharges in the Earth-ionosphere cavity would propagate with a horizontal traverse magnetic field that is perpendicular to the direction of propagation. [citation]. However, regardless of source, the existence of random occurring impulses is recognized.

SUMMARY OF THE INVENTION

The foregoing needs are met, to a great extent, by the present invention, wherein in one aspect an improved method and apparatus for passive geophysical prospecting are provided for obtaining a more sensitive and precise measurement of the presence and character of relatively small deposits of valuable materials, hydrocarbons, ore deposits, and precious minerals.

According to one embodiment of the present invention, a passive geophysical prospecting apparatus is provided that includes a magnetic component electromagnetic antenna configured to detect a magnetic component of electromagnetic radiation naturally emanating from the Earth's surface. The antenna is also configured to generate an electrical signal from the detected magnetic component while traversing above the Earth's surface where the magnetic component contains information regarding the presence or absence of a subsurface deposit of interest. The apparatus additionally includes a filter configured to filter from the electrical signal frequencies below 65 Hz and above 12,000 Hz to generate a filtered signal, and a converter to convert the filtered signal into a prospecting signal. The apparatus also includes a level detector to compare the prospecting signal and a reference signal and to generate a difference signal and a computer to analyze the difference signal to determine the absence or presence of the subsurface deposit of interest.

According to another embodiment of the present invention, a passive geophysical prospecting apparatus is provided. The apparatus includes a magnetic sensing antenna, wherein the magnetic sensing antenna is configured to detect a magnetic component of electromagnetic radiation naturally emanating from the Earth's surface and produce an electrical signal while traversing above the Earth's surface. Additionally, the apparatus includes a filter configured to filter the electrical signal to produce a filtered signal, and a computer configured to analyze the filtered signal to determine the presence or absence of a subsurface deposit of interest.

According to yet another embodiment of the present invention a passive geophysical prospecting apparatus is provided. The apparatus includes a magnetic sensor for detecting a magnetic component of the electromagnetic radiation naturally emanating from the Earth's surface and generating an electrical signal from the detected electromagnetic radiation where the magnetic component contains information regarding the presence or absence of a subsurface deposit of interest.

In accordance with still another aspect of the present invention, a passive geophysical prospecting method is provided. The method includes the steps of traversing above the surface of the Earth with a magnetic sensing antenna, detecting a magnetic component of the electromagnetic radiation naturally emanating from the Earth's surface with the magnetic sensing antenna, generating an electrical signal from the detected magnetic component where the magnetic component includes information regarding the presence or absence of a deposit of interest.

A passive geophysical prospecting method is provided. The method comprises: traversing above the surface of the Earth with an antenna; detecting electromagnetic radiation naturally emanating from the Earth's surface with the magnetic sensor antenna; generating an electrical signal from the detected magnetic component of the electromagnetic radiation while performing the traversing step; filtering from the electrical signal frequencies below 65 Hz, preferably below 100 Hz and more preferably below 800 Hz, and above 12,000 Hz, preferably above 8,000 Hz, to generate a filtered signal; converting the filtered signal to a prospecting voltage signal; and comparing the prospecting voltage signal to a set voltage (or reference voltage) and generate an output signal which provides information regarding the presence or absence of the deposit of interest. The output signal is preferably in the form of a voltage or as counts in analog or digital format. The output signal can be recorded and can also be converted from a voltage to counts.

A passive geophysical prospecting apparatus is also provided. The apparatus comprises: a magnetic sensor antenna for detecting the magnetic component of the electromagnetic radiation naturally emanating from the Earth's surface and generating an electrical signal from the detected electromagnetic radiation while traversing above the Earth's surface; a filter for filtering from the electrical signal frequencies below 65 Hz, preferably below 100 Hz and more preferably below 800 Hz, and above 12,000 Hz, preferably 8,000 Hz to generate a filtered signal; a converter for converting the filtered signal to a prospecting voltage signal; a level detector for comparing the prospecting voltage signal and a set voltage and generating a difference signal; and means for recording the difference signal.

Certain embodiments of the invention are outlined above in order that the detailed description thereof may be better understood, and in order that the present contributions to the art may be better appreciated. There are, of course, additional embodiments of the invention that will be described below and which will form the subject matter of the claims appended hereto.

In this respect, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

BRIEF DESCRIPTION OF THE SEVERAL VIEWS OF THE DRAWINGS

Further features of the present invention will become apparent to those skilled in the art to which the present invention relates from reading the following description with reference to the accompanying drawings, in which.

DETAILED DESCRIPTION OF THE INVENTION

The invention will now be described with reference to the drawing figures, in which like reference numerals refer to like parts throughout. According to an embodiment of the present invention, a passive geophysical prospecting apparatus is provided that includes a magnetic sensing antenna, the magnetic sensing antenna being configured to detect a magnetic component of electromagnetic radiation naturally emanating from the Earth's surface. The magnetic sensing antenna is additionally configured to producing an electrical signal while traversing above the Earth's surface. The apparatus further includes a filter configured to filter the electrical signal and produce a filtered signal and a computer configured to analyze the filtered signal to determine the presence or absence of a subsurface deposit of interest. The above description is of an embodiment of the present invention and as such, is not intended to suggest any limitation in the scope of using or functionality of the invention.

Figure 1:
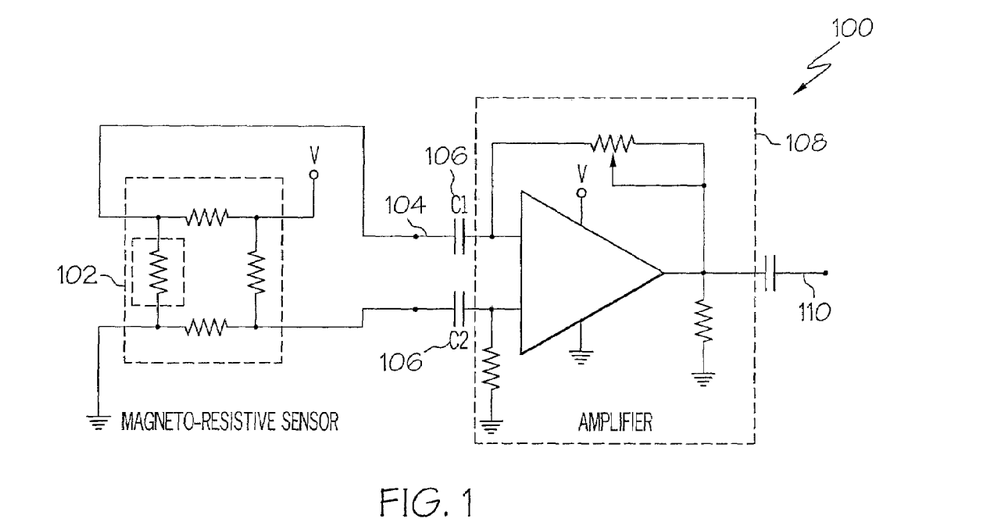
FIG. 1 shows a block diagram of an embodiment of the magnetic sensor antenna for the magnetic component of the electromagnetic impulse survey apparatus according to the present invention.

FIG. 1 shows a block diagram of a magnetic component electromagnetic antenna apparatus according to the present invention. The magnetic sensing antenna 100 comprises a magneto-resistive sensor 102 for detecting a magnetic component of electromagnetic impulses originating from subsurface formations. Magneto-resistive sensor 102 produces a signal 104 which passes through capacitors 106 (C1 and C2) to an amplifier 108. Capacitors 106 (C1 and C2) block the DC component of the Earth's magnetic fields to produce a signal that includes a magnetic component of the AC electromagnetic impulses. Capacitors 106 thereby decouple DC current/voltage from the signal while allowing an oscillating current/voltage to pass to amplifier 108. Amplifier 108 boosts the remaining oscillating current/voltage portion of the signal to produce antenna signal 110.

The magneto-resistive sensor 102 is well suited for detecting electromagnetic transient pulses within the Earth's electromagnetic fields. Magneto-resistive sensor 102 is preferably a magneto-resistive IC sensor such as part number HMC1001 available from Honeywell International Inc. The teachings of the HMC1001 datasheet are incorporated herein by reference.

According to an embodiment of the present invention, a method of locating subterranean accumulations of hydrocarbons or other valuable minerals is described with reference to FIG. 1. The magnetic component antenna 100 is traversed over a homogeneous area. The magnetic component antenna 100 can traverse the area by attachment to a mobile vehicle or traverse via an airborne craft. The signals received by the magnetic component antenna 100 are amplified by a buffer amplifier 120 such that the signal gain is between 100 and 500, for example.

Figure 2:
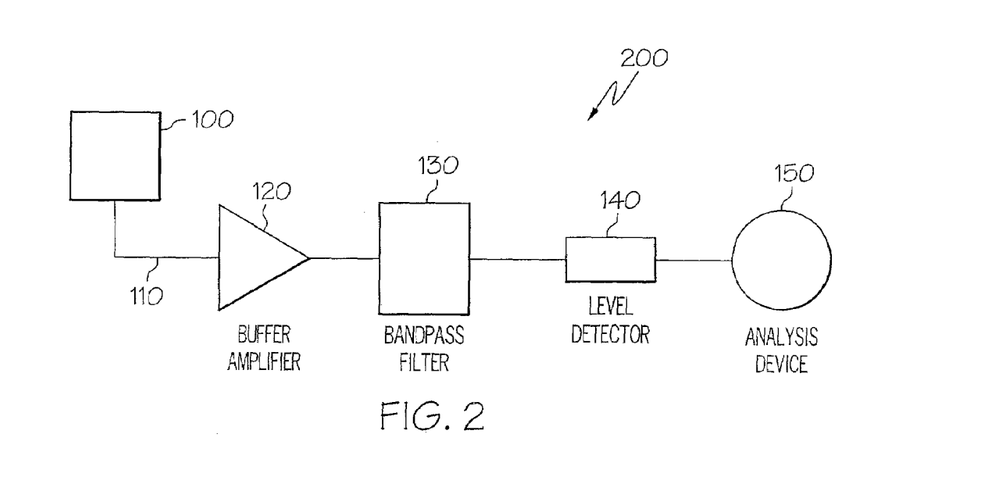
FIG. 2 shows a block diagram of an embodiment of the electromagnetic impulse survey apparatus according to the present invention.

FIG. 2 shows a block diagram of an electromagnetic impulse survey apparatus 200 according to an embodiment of the present invention. The apparatus 200 comprises the magnetic sensor antenna 100 of FIG. 1 for detecting electromagnetic impulses originating from subsurface formations. Magnetic sensor antenna 100 produces antenna signal 110 which is amplified in an amplifier 120. The amplified signal is then passed through a band pass filter 130 to selectively eliminate frequencies below a certain frequency level and also frequencies above a specific frequency.

Filtering may be accomplished by a single device, a high pass filter in combination with a low pass filter, or via software on a computer. The signal exiting the band pass filter 130 is then sent to a level detector 140. The level detector 140 compares the signal to a set output voltage reference. When the signal exceeds a set voltage reference of the level detector 140, a pulse or count is output to an analysis device 150. Typically, counts per second are output to either a computer for digital counting and alarm detection or to a voltage detection circuit for recording the counts per second on a chart recorder.

Figure 3:
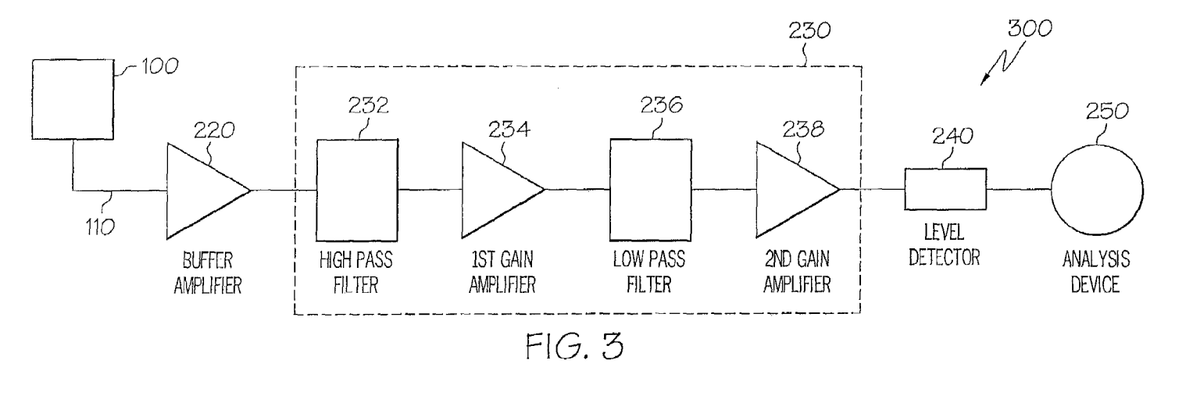
FIG. 3 shows a block diagram of another embodiment of the electromagnetic impulse survey apparatus according to the present invention.

Referring to FIG. 3, a block diagram of an embodiment of the present invention is shown. The electromagnetic impulse survey apparatus 300 comprises the magnetic sensor antenna 100 of FIG. 1 for detecting the electromagnetic noise of the formations traversed. The antenna signal 110 is then passed from the magnetic sensor antenna 100 to a buffer amplifier 220. The signal is then sent to the band pass filters 230 which may be set to pass different bands of frequencies and eliminating those frequencies outside their respective ranges. For example, the band pass filters 230 may be set to pass a frequency range from about 65 Hz to about 12,000 Hz, for example from about 800 Hz to about 8,000 Hz, to yield overall formation noise. Frequencies below and above the specified ranges would be eliminated to provide the sought after information.

According to an embodiment of the present invention, the band pass filtering stage is preferably within the audio frequency range. The band pass filtering stage more preferably having at least one channel wherein the channel filters out frequencies below 65 Hz, preferably below 100 Hz and more preferably below 800 Hz, and above 12,000 Hz, preferably above 8,000 Hz, to provide hydrocarbon information.

As shown in the embodiment of FIG. 3, band pass filter 230 includes a high pass filter 232, a first gain amplifier 234, a low pass filter 236, and a second gain amplifier 238. The output of the high pass filter 232 is amplified in the first gain amplifier 234 and then sent through the low pass filter 236. The resulting signal is again amplified in the second gain amplifier 238 and sent to a level detector 240 which compares the resulting noise signal to a voltage reference. In one embodiment, the reference voltage is 2.5V. When the signal exceeds the reference voltage level of the level detector 240, a pulse or count is output to an analysis device 250.

The analysis device 250, typically a computer for digital counting and alarm detection and processing or a voltage detection circuit for recording counts per second on a chart recorder, compares the counts per second registered by the level detector 240 with a base count. The base count can be established by traversing the magnetic sensor antenna 100 across the surface in the near Earth surface atmosphere over an established homogeneous area and determining the number of impulses encountered per second within the desired frequency range. The counts per second are directly proportional to the strength of the secondary fields. As the magnetic sensor antenna 100 approaches an area where an increased secondary field exists, the count rate will increase. Thus, for example, because the size of a hydrocarbon accumulation determines the strength of the magnetic field, as the magnetic sensor antenna 100 approaches an area of large hydrocarbon accumulation, the count rate will increase.

Preferably, between the magnetic sensor antenna 100 and the respective amplifier 120 or 220 is a load resistor attached to ground (for example, a 500 ohm pot) for impedance purposes. Exemplary level detectors 140 and 240 with associated pulse density circuitry may include those used in U.S. Pat. No. 5,777,476 to Jackson, incorporated herein by reference.

In an embodiment according to the present invention, a method of locating subterranean accumulations of hydrocarbons or other valuable minerals is described with reference to FIG. 2. The antenna 100 is traversed over a homogeneous area. The antenna 100 can traverse the area by attachment to a mobile surface vehicle or traverse via an airborne craft. The signals received by the antenna 100 are amplified by the buffer amplifier 220 such that the signal gain is between 100 and 500, for example. The signal is then passed through high pass filter 232 with a frequency cut off at 65 Hz, preferably 100 Hz and more preferably 800 Hz, for example, with a 120 db drop off. After passing through the first gain amplifier 234, the signal passes through the low pass filter 236 with a frequency cut off at 12,000 Hz, preferably 8000 Hz, for example, with a 120 db drop off. The resulting signal is a filtered response of, for example, from 800 Hz to 8,000 Hz. The filtered signal is then buffered and gained using the second gain amplifier 238.

Once the filtered signal is obtained, it is input into the level detector 240. The level detector 240 has a selected voltage reference. The signal is increased with the second gain amplifier 238 until the threshold voltage reference is exceeded, which outputs a pulse count. The signal is again increased until the pulse count per second falls between 60 and 150 counts, for example. The number of counts per second over the homogenous area becomes the base count.

After determining the base count, the area is traversed and the antenna 100 continues to receive signals. As the antenna 100 approaches an area where an increased secondary field exists, the count rate will increase, that is, exceed the base count. The increase is directly proportional to the strength of the secondary fields, which are directly proportional to the hydrocarbon accumulation. Thus, once the base count is determined, increases representing hydrocarbon accumulations can be easily and readily identified. It should be noted that, because the secondary magnetic fields exist over water as well as land, surveys for hydrocarbons utilizing the present apparatus and method can readily be conducted over the oceans that cover the Earth. Unlike radioactivity logs which cannot distinguish between water and hydrocarbons, the present invention does readily distinguish between these two and the identification of hydrocarbons is not affected or inhibited by the presence of water.

Figure 4:
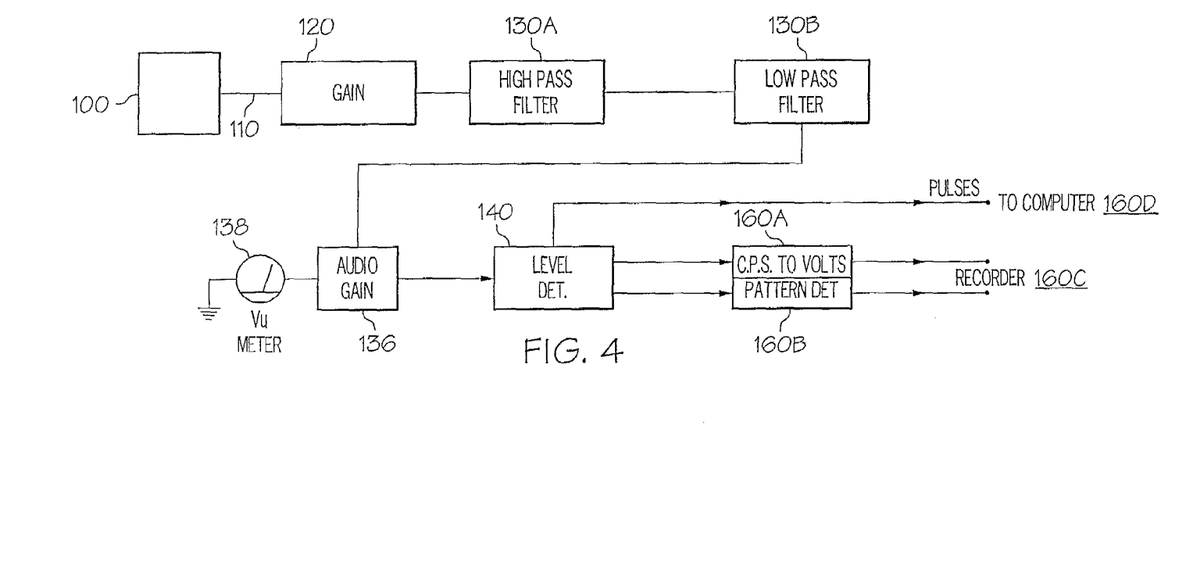
FIG. 4 shows a block diagram of another embodiment of the electromagnetic impulse survey apparatus according to the present invention.

Now referring to FIG. 4, there is shown a functional representation of another embodiment of the present invention. An apparatus 300 is depicted having an antenna 100, a first amplifier 120, a high pass filter 130a, a low pass filter 130b, a second amplifier 136, a meter 138, a voltage level detector 140, a rate meter 160a and a pattern detector 160b. Outputs are provided for a chart recorder 160c (not shown) and to a computer 160d (not shown). The analysis device 160 of FIG. 2 are devices 160a, 160b, 160c and 160d, each of these either used alone or in any combination thereof.

In a specific embodiment, amplifier 120 using a LF442CN dual operational amplifier available from National Semiconductor then amplified the sensed signal from antenna 110. The high pass filter 130a may include an active high pass filter using a Burr Brown UAF42 Universal Active Filter configured as a Butterworth filter. The low pass filter 130b may include a Burr Brown UAF42 Universal Active Filter configured as a Butterworth filter. The combination of the high pass filter 130a and low pass filter 130b result in a pass band of frequencies from about 800 Hz to about 8,000 Hz to yield overall formation noise. The band passed signal is then amplified using a National Semiconductor LM380 audio amplifier 136.

The output of the audio amplifier 136 is then sent to the voltage level detector 140 comprising a National Semiconductor LM311 voltage comparator. This detector 140 compares the signal input thereto against a selectable reference DC voltage to generate a difference signal that is proportional to the secondary fields of interest. The reference DC voltage level can be adjusted using a potentiometer to a desired level to increase or reduce the sensitivity of the detector 140. For example, the reference DC voltage level can be set to a value corresponding to a known area devoid of hydrocarbons so that slight variations above this level will be recognized in the signal range of interest. The comparator, i.e., detector, 140 is configured to output pulses of from 0 to 5 volts representing the important information about subterranean geologic formations and their contents, i.e., hydrocarbons or precious metals.

The output of the comparator 140 may be sent to a rate meter 160a to be converted from pulses per second to a corresponding voltage. The voltage output of the rate meter 160a is used to establish a base line reference for recording purposes. The output of the comparator 140 is also sent to a pattern detector 160b which counts the number of pulses in a given period of time and outputs a response to a recorder 160c (not shown in FIG. 4) when a preselected number of pulses for a given time period is encountered or exceeded.

The pre-selected number of pulses in a given time period is preferably adjustable. This variable may be adjusted based on the activity encountered in the signal of interest. This difference in activity may be due to the difference in material being prospected, e.g., oil versus gold, and/or the quantity of such material encountered in the subterranean formation. An output from the comparator 140 is also available to a computer 160*d* (not shown on FIG. 4) where the pulses are digitized and processed using methods and techniques known by those skilled in the art to determine the pulse density over a selected period or unit of time. Processed information may then be printed using a printer (not shown) or shown on a computer screen (not shown).

Figure 5A:
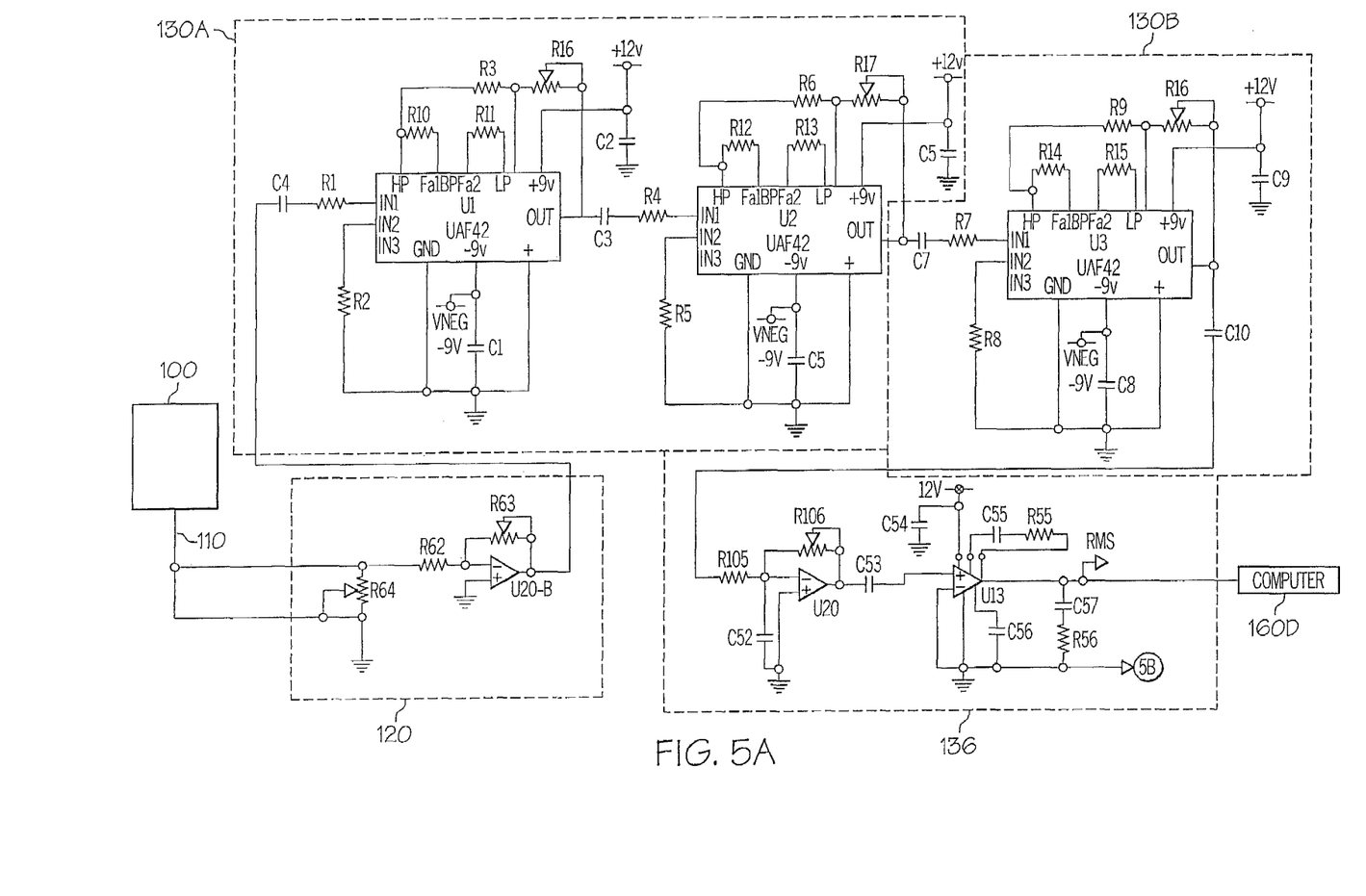
FIGS. 5A and 5B is a detailed schematic of the embodiment shown in FIG. 4.
Figure 5B:
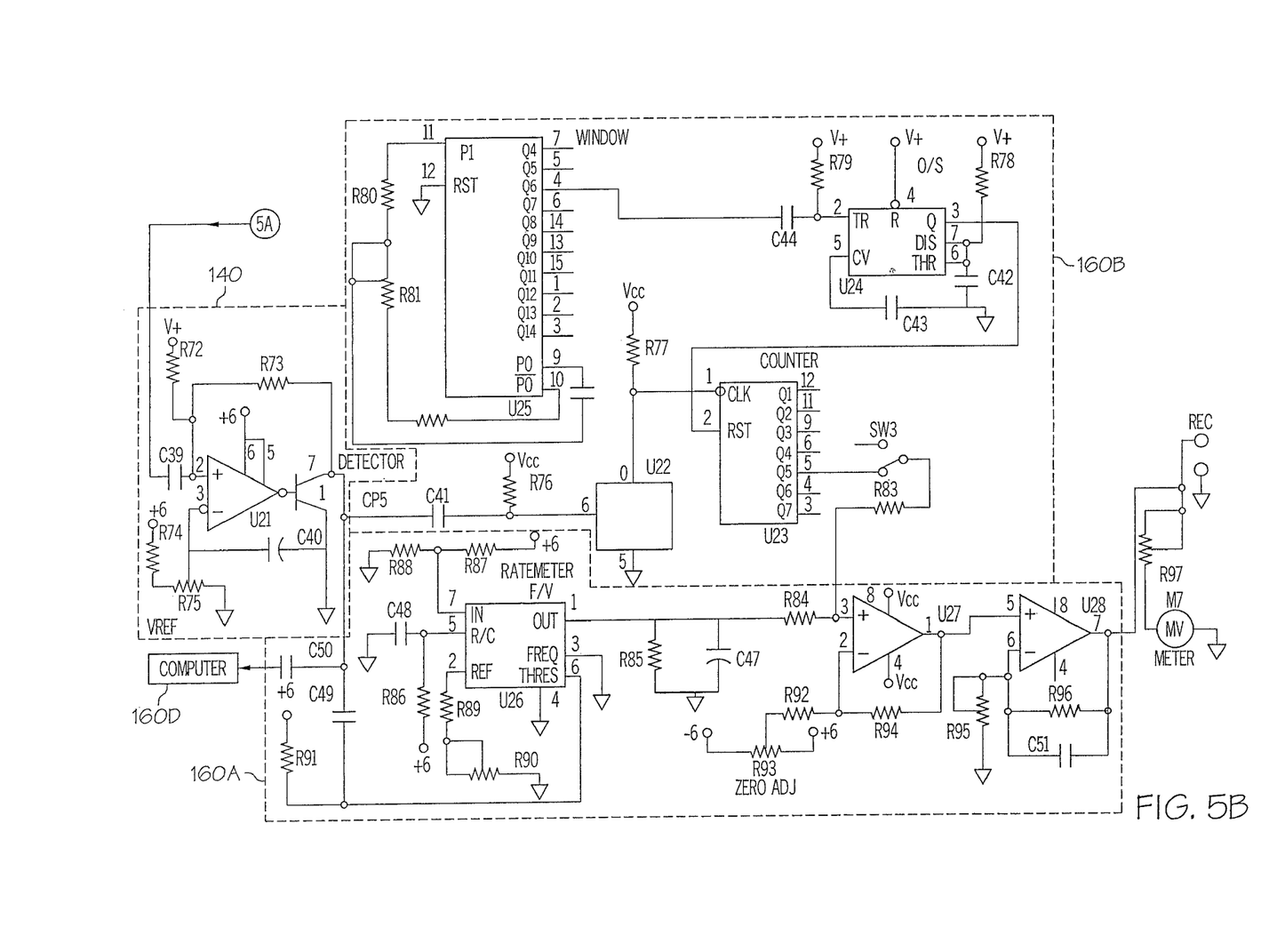

FIGS. 5A and 5B with minor differences (detailed in parenthetical where appropriate) are a detailed schematic of the embodiment shown in FIG. 4. FIG. 5A depicts the magnetic sensor antenna 100 and the circuitry for amplifier 120, high pass filter 130*a* (two UAF42's instead of one), low pass filter 130*b* and amplifier 136 (which includes a dual op amp LF442CN prior to the LM380). FIG. 5B depicts the circuitry for the voltage level detector 140, rate meter 160*a*, pattern detector 160*b* and computer 160*d*.

The following is a list of the components in FIGS. 5A and 5B. In regards to adjustable resistors or potentiometers, "(adj.)" is indicated next to the maximum resistance. "UAF42" refers to a universal active filter available from Burr Brown. "LF442CN","LM1496","LM311", "LM380", "LM555" and "LM331" refer to products available from National Semiconductor. "2n 7000" is a transistor wherein "G" stands for gate, "D" stands for drain and "S" stands for source. "4024" and "4060" are generic chips known to those skilled in the art. "OP 290" is an operational amplifier.

Capacitors: C1—1 muF C2—1 muF C3—0.1 muF C4—0.1 muF C5—1 muF C6—1 muF C7—0.1 muF C8—1 muF C9—1 muF C10—0.1 muF C39—1 muF C40—33 muF C41—1 muF C42—0.01 F C43—0.01 F C44—0.1 F C45—0.01 F C47—4.7 muF C48—0.01 muF C49—470 pF C50—0.1 F C51—1 muF C52—0.0047 muF C53—0.1 muF C54—0.1 muF C55—10 muF C56—0.01 muF C57—0.05 muF Resistors: R1—20 K ohm R2—20 K ohm R3—1 K ohm R4—50 K ohm R5—20 K ohm R6—1 K ohm R7—50 K ohm R8—28 K ohm R9—1 K ohm R10—93.1 K ohm R11—93.1 K ohm R12—191 K ohm R13—191 K ohm R14—34 K ohm R15—34 K ohm R16—10 K ohm (adj.) R17—10 K ohm (adj.) R18—10 K ohm (adj.) R55—1 K ohm R56—5.1 K ohm R62—1 K ohm R63—10 K ohm (adj.) R64—10 K ohm (adj.) R72—50 K ohm R73—2 meg ohm R74—10 K ohm R75—5 K ohm (adj.) R76—10 K ohm R77—10 K ohm R78—100 K ohm R79—100 K ohm R80—100 K ohm R81—100 K ohm (adj.) R82—20 K ohm R83—470 K ohm R84—1 K ohm R85—100 K ohm R8—66.8 K ohm R87—10 K ohm R88—50 K ohm R89—10 K ohm R90—10 K ohm (adj.) R91—10 K ohm R92—1 K ohm R93—10 K ohm (adj.) R94—1 K ohm R95—1 K ohm (adj.) R96—10 K ohm R97—5 K ohm (adj.) R105—1 K ohm R106—20 K ohm (adj.)

Chips and Operational Application: U1—UAF42 U2—UAF42 U3—UAF42 U12—LF442CN U13—LM380 U20—LF442CN U21—LM311 U22—2n7000 U23—4024 U24—LM555 U25—4060 U26—LM331 U27—OP290 U28—OP290

Switches: SW3

Figure 6:
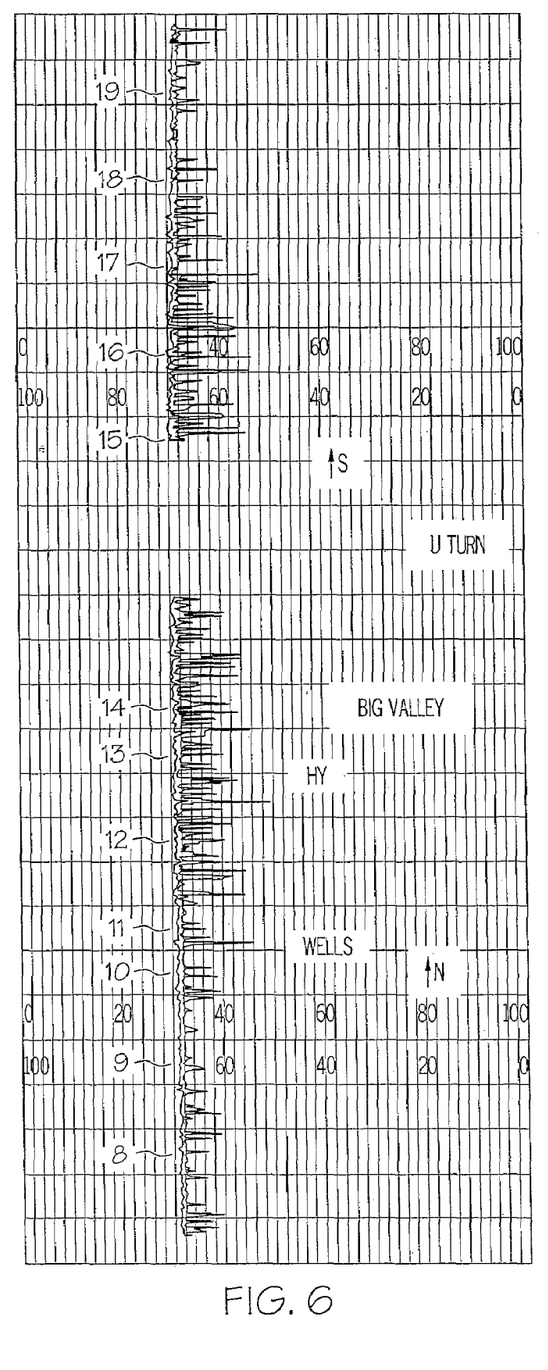
FIG. 6 shows a log obtained using an electromagnetic impulse apparatus according to an embodiment of the present invention.

Referring now to FIG. 6, there is shown a log obtained by using the apparatus of FIGS. 5A & 5B using a chart recorder. The apparatus was carried on a small plane with the antenna trailing below and behind the airplane. The plane flew at a speed of 120 mph at an altitude of 300 feet. This airborne run was performed by flying from South to North (S to N) for about 6 miles and then making a u-turn flying North to South (N to SO for about 6 miles retracing the initial S to N flying route over the Big Finn Valley Reef Oil Field in Alberta, Canada (Big Valley notation on the log).

The S to N mile markers 07 through 14 and N to S mile markers 15 through 20 are shown on FIG. 6. GPS waypoints were saved at each mile mark to correlate the signal strength (counts) with the GPS positions. The notations "wells" and "Hy" (for highway) were made on the log for additional reference points. Increased pulse or count density (signal strength) was encountered between markers 11-14 and on the return trip at 15-18, with the wells notation at mark 11.

Though not shown, a map of the area can be scanned into GPS mapping software on a computer, for example, Des Newman's OziExplorer Version 3.84.2, which works with Magellan, Garmin, Lowarance, Eagle and MLR GPS receivers. Then, the stored waypoint data in the GPS receiver can be downloaded into this software to indicate the positions where the airborne survey was conducted.

In this case, a Garmin receiver was used. The waypoints for the route flown at the markers identified on the log were downloaded into the software program. The count or signal strength were noted on the map to identify areas of greatest interest.

The map can be an underground topographical map from 3-D seismic showing the strata formations which are conducive to the accumulation hydrocarbons. The count data can be positioned on the map to identify areas of greatest interest for additional airborne surveys.

Further, the survey can be performed where the fly routes are a series of parallel routes at predetermined spaced distances or a grid pattern and the data placed on the map by relative strength indications using different colors on the map, thereby corresponding the data to the geology of the area to identify areas of greatest interest for additional airborne surveys to fine tune the map and/or pinpoint potential drilling sites.

Rather than or in addition to the chart recording, the data can be captured on a computer and displayed on the computer screen along with the GPS location (that is also downloaded to the computer) in real-time.

Many methods can be employed to indicate count rates exceeding that of the base count. In an embodiment in accordance with the present invention, an alarm similar to a radiation detector triggers a response once the base count has been exceeded.

One of ordinary skill in the art will appreciate that processes in accordance with the teachings of the present invention are capable of being performed and distributed in the form of a computer readable medium of instructions and a variety of forms and that the present invention applies equally regardless of the particular type of signal bearing media actually used to carry out the distribution.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A passive geophysical prospecting apparatus, the apparatus comprising:
    an antenna, wherein said antenna comprises a magneto-resistive sensor and is configured to (i) detect an oscillating magnetic component of electromagnetic radiation naturally emanating from a section of the Earth's near surface while blocking a DC component of the electromagnetic radiation as the antenna traverses above said section, and (ii) generate an AC electrical antenna signal from said detected magnetic component;

an amplifier adapted to amplify the antenna signal;

a filter, wherein said filter is configured to filter from said antenna signal frequencies below 65 Hz and above 12,000 Hz to generate a filtered signal;

a level detector, wherein said level detector is configured to determine when said filtered signal exceeds a reference voltage and generate a pulse; and a computer, wherein said computer is configured to analyze a plurality of pulses occurring over a unit of time to determine the absence or presence of a subsurface deposit of interest underneath said section.

2. A passive geophysical prospecting apparatus, the apparatus comprising:

a magneto-resistive magnetic sensing antenna, wherein said magneto-resistive magnetic sensing antenna is configured to (i) detect an oscillating magnetic component of electromagnetic radiation naturally emanating from the Earth's surface while blocking a DC component of the electromagnetic radiation and (ii) produce an associated electrical signal while traversing above the Earth's surface;

a filter, wherein said filter is configured to filter said electrical signal to produce a filtered signal; and a computer, wherein said computer is configured to analyze said filtered signal to determine the presence or absence of a subsurface deposit of interest; and is further configured to provide: a level detector for comparing said filtered signal and a reference voltage to determine a pulse count.

3. A passive geophysical prospecting method comprising the steps of: traversing above the surface of the Earth with a magneto-resistive magnetic sensing antenna; detecting pulses within an oscillating magnetic component of the electromagnetic radiation naturally emanating from the Earth's surface while removing any non-oscillating magnetic component from said detected electromagnetic radiation with said magneto-resistive magnetic sensing antenna; generating an electrical signal from said detected magnetic component; establishing a base output pulse count of an area devoid of a deposit of interest; and analyzing the difference between a pulse count associated with said electrical signal and said base pulse count to determine the absence or presence of a deposit of interest.

4. The method of claim 3 wherein said generating an electrical signal step occurs while traversing above the surface of the Earth.

5. A geophysical prospecting apparatus comprising:

a magnetic sensing antenna including (i) a magneto-resistive sensor; and (ii) a signal amplifier, the mango-resistive sensor and the signal amplifier being operatively coupled by way of a pair of capacitors, the capacitors adapted to decouple a DC current/voltage component in a signal received by the magneto-resistive sensor from the signal amplifier;

a filter, the filter being adapted to filter from the signal received from the magnetic sensing antenna frequencies below 65 Hz and above 12,000 Hz to generate a filtered signal;

a level detector adapted to compare the filtered signal to a set reference voltage and registers a count for each pulse in the signal exceeding the reference voltage; and an analyzer for determining the number of counts per unit of time.

6. A combination comprising an airplane and the apparatus of claim 5 wherein the apparatus is adapted to detect a magnetic component of electromagnetic radiation naturally emanating from the Earth's near surface while the airplane traverses above the surface of the Earth.

7. A method of geophysical prospecting using the apparatus of claim 5, the method comprising:

traversing above the surface of the Earth with the apparatus;

detecting a magnetic component of electromagnetic radiation naturally emanating from the Earth's near surface;

generating an electrical signal from said detected magnetic component; and determining a pulse count relative to a first portion of the Earth's near surface by counting the number of pulses contained in the electrical signal exceeding a reference voltage.

8. The method of claim 7 further comprising: establishing a base pulse count relative to a second portion of the Earth's near surface known to be devoid of a deposit of interest; and analyzing the pulse count for the first portion relative to the second portion to determine the presence of said deposit of interest.

* * * * *

UNITED STATES PATENT AND TRADEMARK OFFICE
CERTIFICATE OF CORRECTION

PATENT NO. : 7,397,417 B2  Page 1 of 1
APPLICATION NO. : 11/468628
DATED : July 8, 2008
INVENTOR(S) : John R Jackson

It is certified that error appears in the above-identified patent and that said Letters Patent is hereby corrected as shown below:

Claim 5 in column 12, line 3:

"mango-resistive" should be "magneto-resistive"

Signed and Sealed this

Nineteenth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,397,417 B2
APPLICATION NO. : 11/468628
DATED : July 8, 2008
INVENTOR(S) : John R Jackson It is certified that error appears in the above-identified patent and that said Letters Patent is hereby corrected as shown below:

Claim 5 in column 12, line 6:

"mango-resistive" should be "magneto-resistive"

This certificate supersedes the Certificate of Correction issued May 19, 2009.

Signed and Sealed this

Ninth Day of June, 2009

JOHN DOLL
*Acting Director of the United States Patent and Trademark Office*